July 24, 1962 — J. ČABELKA — 3,046,383
PROCESS OF ELECTRICALLY WELDING UNDER A LAYER OF MOLTEN SLAG
Filed Sept. 9, 1960

INVENTOR.
Jozef Čabelka

United States Patent Office 3,046,383
Patented July 24, 1962

3,046,383
PROCESS OF ELECTRICALLY WELDING UNDER A LAYER OF MOLTEN SLAG
Jozef Čabelka, Bratislava, Czechoslovakia, assignor to Vyskumny ustav svaracsky MHD, Bratislava, Czechoslovakia, a company of Czechoslovakia
Filed Sept. 9, 1960, Ser. No. 54,978
6 Claims. (Cl. 219—73)

The present invention relates to electric welding processes, and more particularly to a process of electric welding in which the effective portion of the welding electrode is submersed under molten slag.

In the known method of electric welding under slag which will hereinafter be referred to as "electro-slag welding," a layer of molten slag or flux is formed on the object to be welded. The object is connected to one pole of a source of welding current, and the other pole is connected to a fusible electrode of weld metal the tip of which is immersed in the molten slag layer. Passage of current through the electrode and the layer of slag without formation of an arc provides the thermal energy for fusing the electrode material. The slag dissolves oxides or other surface contaminants on the object to be welded so as to establish a firm bond with the weld material.

Electro-slag welding permits a vertically inclined seam to be formed between heavy metal plates. For this purpose, it has been previously proposed to build a weld seam progressively from its lowest point upward between the edges of the plates which are to be joined and which may be distant from each other by as much as 30 or 45 millimeters. The lowermost portions of the gap between the plates are bridged by cooled shields having opposite faces substantially in the planes of the aligned surfaces of the plates so as to form a trough between the plates. A pool of weld metal and of supernatant slag is formed in the trough to link the edges of the plates. The welding electrode is immersed in the molten slag and weld metal is gradually transferred from the electrode to the pool so that the metal surface of the latter rises and lifts the layer of slag. The bottom of the pool simultaneously solidifies so that the shields may be raised at a rate corresponding to the rise of the molten metal level. The electrode is raised at the same rate.

To ensure continuous operation without arcing, it is necessary that the molten slag layer above the pool of weld metal remain of sufficient molten depth so as completely to fill the space between the electrode tip, the plates that are being welded together, and the pool of liquid weld metal. When the top of the slag layer rises too high, say beyond 60 millimeters above the electrode tip, and thereby above the area of heat-producing current flow, the top portion of the slag layer is bound to freeze and to interfere with further upward movement of the electrode.

It is thus essential to maintain a substantially uniform thickness of molten slag. A small amount of slag is lost by decomposition, volatilization, or by leakage through the movable shields which confine the welding area and it has been customary to add small amounts of flux or slag to make up for the losses which, however, are quite small.

Although the electro-slag process described would appear to permit doing what is very difficult or even impossible to achieve with any other welding method, namely, to produce a vertical weld between two spaced heavy metal plates, it has not been extensively applied for this purpose. The welds produced were found to lack metallurgical homogeneity. This condition can be remedied to a limited extent by annealing or normalizing, but such heat treatment must not be resorted to if the mechanical properties of the welded plates are critical, and if the plates consist of cold-worked carbon or alloy steel.

Although the heat treatment somewhat improves the mechanical properties of the weld, the weld material still lacks chemical homogeneity, and its mechanical properties can not match those of welds produced with shielded electrodes, A weld produced by electro-slag welding in a vertical seam by the known method is essentially unstable under dynamic and other stresses, and its mechanical properties are subject to change by aging.

An important object of the invention is the provision of an improved electro-slag welding method which permits the production of chemically and mechanically homogeneous welds extending in a vertical direction.

Another object is the provision of such a method which is suitable for welding carbon and alloy steel objects without necessarily requiring a subsequent heat treatment.

A further object is the provision of a method which provides welds of satisfactory strength between heavy plates such as are employed in the construction of equipment intended to handle radio-active material and frequently involving the welding of thick-walled containers.

It has now been found that the drawbacks of the hitherto produced electro-slag welds between vertically extending edges of heavy plates are due to the gradual deterioration of the solvent power of the slag layer for the surface impurities and the like, as welding proceeds. It has furthermore been found that welds which are chemically homogeneous and of uniformly excellent mechanical properties can be produced by keeping the slag layer in a condition of substantially constant high affinity for the impurities which it is intended to absorb. Maintaining such a condition of affinity of the slag is thus another object of this invention.

With these and other objects in view, the invention provides a welding process in which a layer of molten slag is first formed on an object to be welded. An electrode of fusible material is immersed in the layer above the object. An electric current is passed from the electrode through the layer to the object to be welded in such a manner that a portion of the electrode is fused and the fused material is deposited on the object. Additional slag is added to the original layer, and an amount of molten slag substantially corresponding to the addition is simultaneously withdrawn. In this manner, the composition of the molten slag can be held substantially uniform during the welding process.

If a portion of the slag is lost by evaporation, decomposition, or leakage, the additional amount of slag is selected in such a manner as to exceed the losses by a substantial margin, and the withdrawn slag is made to correspond to the excess, that is, to the difference between the added material and the losses so that the total amount of slag in the layer remains substantially constant.

The deterioration of the slag may partly be due to contact of the molten slag with the atmosphere. Oxygen as such may react with the slag, or oxygen dissolved in the slag may produce oxides from the weld material or the plates which are to be welded. These oxides have to be absorbed by the slag and thus reduce its affinity for additional impurities. The useful life of the slag can be extended, and the needed amounts of slag additions held to a minimum by shielding the molten slag from the atmosphere by an inert gas which is made to form a protective atmosphere over the welding area.

When the two edges to be joined are not parallel to each other, it is not adequate to maintain a slag layer of constant amount or weight above the pool of weld metal. If the plate edges diverge upwardly, a constant amount of slag would form a slag layer which becomes shallower as the welding area rises, and vice versa. The need for corresponding adjustment of the total slag amount has been previously recognized, and it will be understood that the additions and withdrawls of slag material proposed by the present invention are additional to any changes in the total amount of the slag layer which may be required by the contours of the welded objects. According to a preferred embodiment of the invention, the molten slag layer is held at a constant height by overflowing the excess produced by additions through orifices of the shields or by overflowing it over the top edges thereof.

The rate of displacement of the molten slag in the welding area, that is, the rate at which new slag is added in excess of the amount required to make up for losses, is controlled depending on the quantity of welding metal fused and on the ability of the molten slag layer of absorbing impurities, that is, on its refining ability. It is preferred to add fresh slag to the molten layer at such a rate that the weight proportion of slag additions and weld metal fused be between the limits of 0.25:1 and 1.5:1. The higher the refining ability of the slag, the lower the proportion of slag relative to the weld metal fused that need be added to the molten layer. For slags of low refining ability, slag additions may amount to as much as one-and-one-half times the weight of the metal fused. The limits indicated have been found by experiment to give the most desirable welds at lowest cost.

For further improvement in the quality of the welds produced, the molten slag is preferably protected in the welding area by an inert gaseous atmosphere. Carbon dioxide and argon are examples of gases which have been found to provide protective atmospheres, and to prevent the slag from absorbing harmful components of the ambient air, and specifically oxygen. The useful life of the slag is thereby greatly extended, and slag replenishment according to the process of the invention may be held to a low value.

Other features and many of the attendant advantages of this invention will be more readily appreciated as the same becomes better understood by reference to the following detailed description when considered in connection with the accompanying drawing, wherein.

Figure 1:
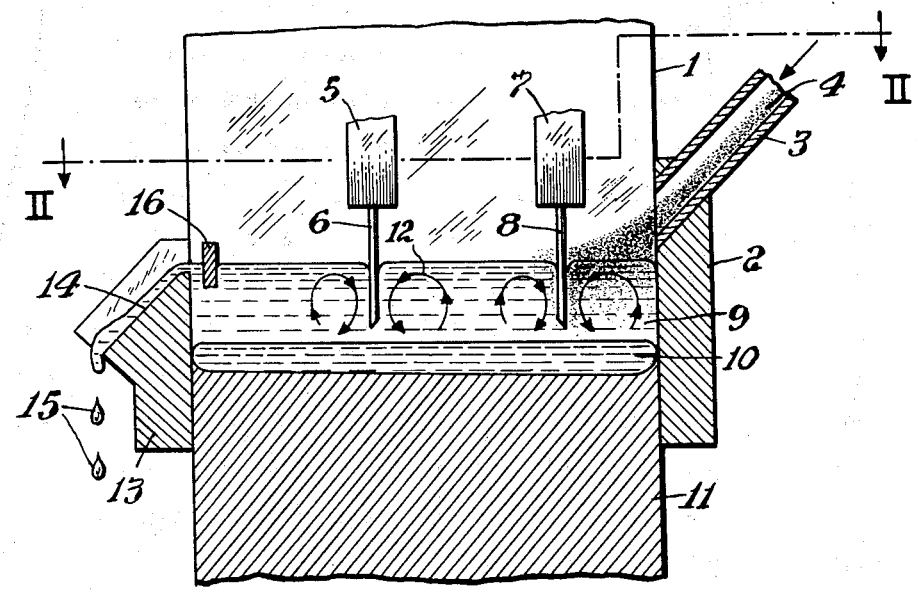
FIG. 1 shows a welding arrangement of the invention in sectional elevation.

Referring now to the drawing in detail, there are shown two steel plates 1 each having a thickness of 200 millimeters and juxtaposed in such a manner that their parallel edges form a vertical gap 30 millimeters wide. The plates 1 are to be welded edgewise to each other by filling the gap with weld metal.

The welding area is confined in a trough formed by the opposite edge faces of the plates 1 and two shields 2 and 13 which have flat faces in abutment against the aligned outer faces of the steel plates 1 so as to bridge the gap between the plates. The welding area is confined in a downward direction by a completed solidified portion 11 of the weld.

The lowermost portion of the trough holds a pool of liquid weld metal 10 on which a layer of molten slag 9 floats because of its lower specific gravity. Slags for performing the electro-slag welding process are well known in themselves. A slag suitable and preferred for performing the process of the invention under the conditions of the specific embodiment illustrated has the following approximate composition:

| | Percent |
|---|---|
| $SiO_2$ | 42 |
| $MnO$ | 35 |
| $CaO$ | 6 |
| $MgO$ | 4.5 |
| $CaF_2$ | 3.5 |
| $Al_2O_3$ | 7 |

Impurities should not exceed 2% of $Fe_2O_3$, and 0.1% each of S and P.

Two electrodes 6, 8 are mounted in respective holders 5,7 in such a manner that the tip portions of the electrodes are immersed in the molten slag 9. As is well known in this art, the holders 5, 7 are equipped with automatic means for advancing the electrodes 6, 8 toward the welding area at the approximate rate at which they are consumed by fusion in such a manner that the distance between the electrode tips and the pool of liquid weld metal 10 remains substantially constant during the welding process. The electrodes 6, 8 and the plates 1 are connected to respective poles (not shown) of a source of welding current which provides the thermal energy required.

One shield 2 is provided with a downwardly inclined supply tube 3 the discharge opening of which is located above the level of the molten slag 9 in the trough. Additional slag material 4 in granular form is introduced through the tube 3 during the welding operation. The other shield 13 is arranged in such a manner that its horizontal upper edge is located at a level below the discharge opening of the tube 3, thus defining the level to which the slag layer 9 may rise in the trough. The shield 13 is formed with a lip 14 over which any excess slag 15 is discharged from the trough. Mixing of the granular added slag material 4 with the molten slag 9 is induced by currents which develop in the slag layer adjacent the electrodes when current flows, as indicated by arrows at 12 in FIG. 1.

The device illustrated operates as follows: To start a weld, a provisional bottom plate (not shown) is provided in the lowermost portion of the gap between the plates 1 and the shields 2 and 13 to form the bottom of a temporary trough which is then charged with molten weld metal 10 and a layer of molten slag 9. The electrodes 6, 8 are placed in position and the operation is started by passing current through the electrodes. The heat generated both in the electrodes 6, 8 and in the slag layer 9 causes the tips of the electrodes to fuse and keeps the slag in molten condition. The electrodes are automatically fed forward toward the welding area at the rate at which they are consumed by fusion, and the holders 5, 7 are withdrawn at the rate at which the level of the pool of molten metal 10 rises and lifts the slag layer 9. The source of thermal energy is thus gradually withdrawn from the provisional bottom plate, and the molten weld metal adjacent the plate solidifies. It forms a plug at the bottom of the welding area and the provisional bottom plate may be removed.

As welding proceeds in an upward direction, the slag is raised sufficiently that it reaches the level of the lip 14 of the shield 13. The total depth of the slag now is 60 mm., and upward movement of the shields at the same rate as the electrode holders 5, 7 is started so that the spatial relationship illustrated in FIG. 1 are maintained to the end of the welding operation. With the inception of shield movement, that is, when normal operating conditions are reached, granular slag or flux material is fed through the tube 3 to the welding area at a rate of one half of the rate of metal fusion. Operations then continue until a welded seam of the desired length is established.

The process of the invention permits welding of heavy steel plates 1 with a gap of 30 millimeters width at a rate of 800 longitudinal millimeters per hour. To close a gap 800 millimeters long, 200 mm. deep, and 30 mm. wide in one hour requires 626 grams of ferrous weld metal per minute. Accordingly, granular slag is added through the tube 3 at a continuous rate of 300 grams per minute. An equal amount of molten slag is simultaneously forced over the lip 14 and is discarded. The freshly added material melts rapidly and mixes with the layer to hold the composition of the molten slag 9 at a constant value.

Figure 2:
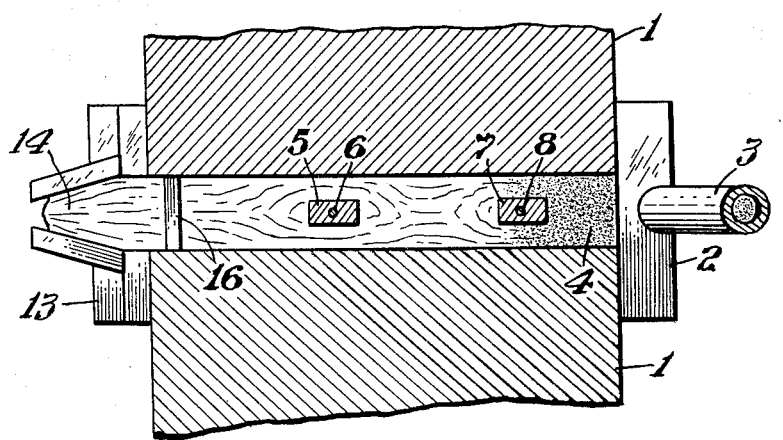
FIG. 2 illustrates the arrangement of FIG. 1 in sectional plan view, the section being taken on the line II—II.

The fact that the tube 3 is mounted in one of the shields and the lip 14 is provided in the other shield prevents freshly added slag material from being discharged without mixing with the slag present. With sufficient depth of the welding area, thorough mixing without discharge of unmixed fresh material can be achieved also by feeding the granular material to a point centrally intermediate the shields, and letting the molten slag overflow over both shields which are shaped in the manner of shield 13 in FIGS. 1 and 2.

The useful life of the slag may be increased, and the rate of substitution of the slag material may be reduced without loss of efficiency if the slag is protected by an inert atmosphere. For this purpose, an insert gas heavier than air, such as carbon dioxide, is admitted to the welding area through the tube 3. It flows across the welding area and sweeps any oxygen present over the lip 14. If it is desired to reduce the consumption of carbon dioxide, a barrier 16 is placed before the lip 14 to permit the overflow of molten slag, but to retain a permanent layer of heavy gas above the slag level.

It has been found that the welding process according to the present invention eliminates the shortcomings which hitherto were inherent in long vertical welds produced by the electro-slag process. Controlled replacement of the molten slag at an adequate rate maintains the refining ability of the slag in the welding area, and particularly its affinity toward oxygen and its chemical compounds. The welds produced according to the method disclosed have uniform chemical composition, and uniform metallurgical and mechanical properties over the entire length thereof. The metal is of great purity and free from oxide inclusions. A subsequent heat treatment is not normally required. The welds produced by the method of the invention are outstanding by their fatigue resistance.

The improvement brought about in the known electro-slag welding process by the present invention permits the process to be employed successfully for the welding of thick-walled carbon and alloy steel equipment which is to be used for handling radioactive material. The welds are not subject to deterioration by aging.

It should be understood, of course, that the foregoing disclosure relates to only a preferred embodiment of the invention, and that it is intended to cover all changes and modifications of the example of the invention herein chosen for the purpose of the disclosure which do not constitute departures from the spirit and scope of the invention set forth in the appended claims.

This is a continuation in part of my co-pending application, Serial Number 788,706, filed on January 26, 1959.

What is claimed and desired to be protected by Letters Patent of the United States is:

1. In an electric welding process, the steps of forming a layer of molten slag on an object to be welded; immersing an electrode of fusible material in said layer above said object; passing an electric current from said electrode through said layer to said object in such a manner that a portion of said electrode is fused and the fused material is deposited on said object; adding an additional amount of slag to said layer; and simultaneously withdrawing a substantially corresponding amount of said molten slag from said layer.

2. In an electric welding process, the steps of forming a layer of molten slag on an object to be welded; immersing an electrode of fusible material in said layer above said object; passing an electric current from said electrode through said layer to said object in such a manner that a portion of said electrode is fused and the fused material is deposited on said object while a portion of said molten slag is lost; adding an additional amount of slag to said layer at a rate greater than the rate at which said molten slag is lost; and simultaneously withdrawing from said layer an amount of said molten slag substantially corresponding to the excess of said additional amount of slag over said lost portion of molten slag.

3. In an electric welding process, the steps of forming a layer of molten slag on an object to be welded; immersing an electrode of fusible material in said layer above said object; passing an electric current from said electrode through said layer to said object in such a manner that a portion of said electrode is fused and the fused material is deposited on said object; adding an additional amount of slag to said layer, the weight ratio of said additional amount to said fused material being substantially between 0.25:1 and 1.5:1; and simultaneously withdrawing a substantially corresponding amount of said molten slag from said layer.

4. In a process of producing an electric weld between vertically extending edges of two plates, said edges defining a gap having vertically elongated open sides, the steps of closing the lowermost portions of said open sides so as to define a welding area in said gap; forming a layer of molten slag in said welding area; immersing an electrode of fusible metal in said layer; passing an electric current from said electrode through said layer in such a manner that a portion of said electrode is fused, and that the fused material being heavier than said molten slag sinks to the bottom of said welding area; adding an additional amount of slag to said layer; and simultaneously withdrawing a substantially corresponding amount of said molten slag from said area.

5. In a process of producing an electric weld between vertically extending edges of two plates, said edges defining a gap having vertically elongated open sides, the steps of closing the lowermost portions of said open sides so as to define a welding area in said gap; forming a layer of molten slag in said welding area; immersing an electrode of fusible metal in said layer; continuously passing an electric current from said electrode through said layer in such a manner that a portion of said electrode is fused, and that the fused material being heavier than said molten slag sinks to the bottom of said welding area; continuously adding additional amounts of slag to said layer; and simultaneously withdrawing a substantially corresponding amount of said molten slag from said area.

6. In a process of producing an electric weld between vertically extending edges of two plates, said edges defining a gap having vertically elongated open sides, the steps of closing the lowermost portions of said open sides so as to define a welding area in said gap; forming a layer of molten slag in said welding area; immersing an electrode of fusible metal in said layer; continuously passing an electric current from said electrode through said layer in such a manner that a portion of said electrode is fused at a predetermined rate, and that the fused material being heavier than said molten slag sinks to the bottom of said welding area; continuously adding additional amounts of slag to said layer at a rate which has a substantially fixed relationship to said predetermined rate; and simultaneously withdrawing an amount of said molten slag from said area at a rate substantially equal to the rate at which said additional amounts are added.

References Cited in the file of this patent

UNITED STATES PATENTS

| | | |
|---|---|---|
| 2,105,079 | Halslag | Jan. 11, 1938 |
| 2,511,976 | Frost | June 20, 1950 |
| 2,864,934 | Bernard et al. | Dec. 16, 1958 |
| 2,902,587 | Bernard | Sept. 1, 1959 |
| 2,907,866 | Yenni | Oct. 6, 1959 |
| 2,920,181 | Rockefeller et al. | Jan. 5, 1960 |
| 2,947,847 | Craig et al. | Aug. 2, 1960 |

FOREIGN PATENTS

| | | |
|---|---|---|
| 1,142,934 | France | Apr. 8, 1957 |